(12) United States Patent
Stone et al.

(10) Patent No.: US 7,636,847 B2
(45) Date of Patent: Dec. 22, 2009

(54) MATERIAL DISTRIBUTION APPARATUS

(75) Inventors: Jonathan James Stone, Berkshire (GB);
Jason Charles Pelly, Berkshire (GB);
Stephen Mark Keating, Reading (GB);
Andrew Collins, Basingstoke (GB);
Daniel Tapson, Basingstoke (GB)

(73) Assignee: Sony United Kingdom Limited, Weybridge (GB)

(*) Notice: Subject to any disclaimer, the term of this patent is extended or adjusted under 35 U.S.C. 154(b) by 257 days.

(21) Appl. No.: 10/158,346

(22) Filed: May 30, 2002

(65) Prior Publication Data
US 2003/0046240 A1 Mar. 6, 2003

(30) Foreign Application Priority Data
Aug. 31, 2001 (GB) ............................ 0121195.2

(51) Int. Cl.
*G06T 1/00* (2006.01)
*H04W 1/32* (2006.01)
(52) U.S. Cl. ............................. 713/176; 705/51
(58) Field of Classification Search .............. 705/51, 705/59, 54; 709/217; 382/100; 375/240; 713/176
See application file for complete search history.

(56) References Cited

U.S. PATENT DOCUMENTS

| | | | | |
|---|---|---|---|---|
| 1,130,490 | A * | 3/1915 | Inoue et al. ................ 261/41.1 |
| 5,629,980 | A * | 5/1997 | Stefik et al. ................... 705/54 |
| 5,748,783 | A * | 5/1998 | Rhoads ....................... 382/232 |
| 5,895,073 | A * | 4/1999 | Moore ......................... 283/70 |
| 5,960,081 | A * | 9/1999 | Vynne et al. ................ 713/176 |
| 6,026,193 | A * | 2/2000 | Rhoads ....................... 382/232 |
| 6,037,984 | A * | 3/2000 | Isnardi et al. ........... 375/240.21 |
| 6,182,218 | B1 * | 1/2001 | Saito .......................... 713/176 |
| 6,226,618 | B1 * | 5/2001 | Downs et al. .................. 705/1 |
| 6,282,299 | B1 * | 8/2001 | Tewfik et al. ............... 382/100 |
| 6,285,776 | B1 * | 9/2001 | Rhoads ....................... 382/100 |
| 6,314,518 | B1 * | 11/2001 | Linnartz ..................... 713/176 |
| 6,345,104 | B1 * | 2/2002 | Rhoads ....................... 382/100 |
| 6,449,377 | B1 * | 9/2002 | Rhoads ....................... 382/100 |
| 6,490,681 | B1 * | 12/2002 | Kobayashi et al. .......... 713/171 |
| 6,553,129 | B1 * | 4/2003 | Rhoads ....................... 382/100 |
| 6,580,819 | B1 * | 6/2003 | Rhoads ....................... 382/135 |
| 6,700,989 | B1 * | 3/2004 | Itoh et al. ................... 382/100 |
| 6,750,985 | B2 * | 6/2004 | Rhoads ...................... 358/3.28 |
| 6,771,796 | B2 * | 8/2004 | Rhoads ....................... 382/100 |
| 6,804,779 | B1 * | 10/2004 | Carroni et al. .............. 713/176 |
| 7,043,019 | B2 * | 5/2006 | Tehranchi et al. ........... 380/218 |

(Continued)

FOREIGN PATENT DOCUMENTS

EP 1130490 A2 * 9/2001

(Continued)

*Primary Examiner*—Evens J Augustin
(74) *Attorney, Agent, or Firm*—Oblon, Spivak, McClelland, Maier & Neustadt, L.L.P.

(57) ABSTRACT

A material distribution apparatus, comprising a material server including a data introduction processor operable to introduce data into material to be distributed with the effect that the introduced data is at least difficult to perceive in the material, and a material impairment processor operable to introduce a reversible impairment into the material. A communications network distributes the impaired material to at least one client processor which includes an impairment reversing processor operable to reverse the impairment of the material to produce client restored material.

52 Claims, 8 Drawing Sheets

U.S. PATENT DOCUMENTS

| | | | |
|---|---|---|---|
| 7,111,167 B1 * | 9/2006 | Yeung et al. | 713/176 |
| 7,130,443 B1 * | 10/2006 | Werner et al. | 382/100 |
| 2001/0051996 A1 * | 12/2001 | Cooper et al. | 709/217 |
| 2002/0007403 A1 * | 1/2002 | Echizen et al. | 709/217 |
| 2002/0122565 A1 * | 9/2002 | Keating et al. | 382/100 |
| 2002/0124173 A1 * | 9/2002 | Stone | 713/176 |
| 2003/0046240 A1 * | 3/2003 | Stone et al. | 705/51 |

FOREIGN PATENT DOCUMENTS

| | | |
|---|---|---|
| JP | 10-254909 | 9/1998 |
| JP | 2000-156781 | 6/2000 |
| JP | 2000-216982 | 8/2000 |
| JP | 2001-051960 | 2/2001 |
| JP | 2001-052072 | 2/2001 |
| JP | 2001-209318 | 8/2001 |
| WO | WO 98/42098 | 9/1998 |
| WO | WO 00/51348 | 8/2000 |
| WO | WO 01/43337 | 6/2001 |
| WO | WO 01/97128 | 12/2001 |

\* cited by examiner

MATERIAL DISTRIBUTION APPARATUS

A material distribution apparatus comprises a material server 1, 6 including a material impairment processor 34 operable to introduce a reversible impairment into the material to be distributed, and a communications network 2 operable to distribute the impaired material to at least one client processor 4. The client processor 4 comprises an impairment reversing processor 90 operable to reverse the impairment of the material to produce restored material. The material server 1,6 includes a material protection processor operable to introduce protection data into the material. The protection data is imperceptible in the material. The protection data serves to allow the detection of misuse of the material.

Generating an impaired version of the material to be distributed provides a facility for a buyer to sample the material before acquisition, whilst discouraging the buyer from using the impaired material in an unauthorised way. If a buyer decides to acquire the material, the client processor is provided with impairment removal data.

Other data, which is imperceptible in the material, may be introduced into the material.

FIELD OF INVENTION

The present invention relates to material distribution apparatus and to methods for distributing material.

"Material" means information signals representing one or more audio, data and image material where image material includes still images, moving images and video.

In this specification the terms "seller" and "buyer", which are used in relation to material, are used for convenience and ease of description. It will be appreciated that these terms do not simply mean someone (seller) who transfers outright ownership to someone else (buyer) for a consideration, usually money, but may include previewing material without purchase. Often, material is licensed to a user (buyer) by a licensor (seller) who allows the licensee to use the material in accordance with defined terms or business rules. Thus the terms seller and buyer have more general meanings and include intermediaries acting on behalf of other persons who may be the ultimate owners of the material and the ultimate users thereof.

BACKGROUND OF THE INVENTION

Material such as audio/video material, data and software programs may be produced for variety of different applications. One of the fields of greatest demand for audio/video material is in the entertainment field where an increase in the number of television channels, particularly in Europe has fuelled an increase in the demand for audio/video productions.

Today, a business profile of the production and consumption of material is characterised by a growing number of independent production companies, which both generate material and have a demand for material to produce for example, audio/video productions. The management and distribution of material, to many interested parties whether or not for commercial reasons, therefore represents a technical problem.

In co-pending International patent application number PCT/GB01/01493 (I-00-74) there is disclosed a multimedia transaction processor for facilitating the sale of multimedia material. A multimedia transaction processor includes a media server operable to store multimedia material from a seller client, and to store metadata representing the content of the multimedia material and data identifying the seller providing the multimedia material. The metadata and the identifying data are stored in association with the multimedia material. An access processor is operable to retrieve from the server possible multimedia material content items corresponding to requested multimedia content by generating meta data from the data requesting the multimedia content. The generated meta data is compared with the meta data stored in association with the multimedia material, and from the comparison possible multimedia content items are retrieved from the server. Data representative of the possible multimedia content items are communicated to a buying client processor. A transaction controller is operable, in response to selection data, to communicate data requesting the selected multimedia content items to the seller client identified by the stored identification and to complete the transaction with the buyer. The multimedia transaction processor provides a facility for clients to sell and to buy multimedia material in order to fulfil a particular need.

GB-B-2329547 (Aliroo Ltd) discloses a system which security tags digital media, by for example scarring and descarring an image. The scarring process is carried out by a user who would typically be one responsible for protecting the rights of the rights owner in the image. The user selects an encryption key and one or more encryption modes, which include:

Shuffling pixels in a group of pixels;
Shuffling groups of pixels;
Modifying colour values within a pixel.
Also a scar area is selected.

A potential licensee opens a scarred image. If the licensee wants the image he pays a fee and receives a licensing password. The licensee employs a descarring tool, and uses it to extract a descarring key and a transaction identifier from the password. The scar is removed and the transaction identifier embedded as an invisible label in the image. This is done in a way which prevents the licensee tampering with the process. The transaction identifier identifies the licensee.

SUMMARY OF INVENTION

According to a first aspect of the present invention there is provided a material distribution apparatus, comprising a material server including a data introduction processor operable to introduce data into material to be distributed, said introduced data being introduced into said material with the effect that the introduced data is at least difficult to perceive in said material, and a material impairment processor operable to introduce a reversible impairment into said material, a communications network operable to distribute said impaired material to at least one client processor, wherein said client processor comprises an impairment reversing processor operable to reverse said impairment of said material to produce client restored material.

As explained above, the business profile for the production and consumption of audio/video material is characterised by many clients having a requirement to buy and sell material. There is therefore a requirement for providing controlled access to material which sellers wish to distribute to potential buyers. However, there remains a technical problem of providing a facility for controlling use of the distributed material. For example, the material may be distributed subject to certain conditions, which the owner or seller would prefer to monitor. Furthermore, the owner of the material has a requirement for enforcing intellectual property rights in the material, for example, to prevent unauthorised copying.

Preferably the communications network provides a bandwidth sufficient to communicate the material. In some embodiments the communications network may include electronic communications channels, the Internet, an Intranet, an Extranet, the Postal system, and couriers. Preferred embodiments of the invention use electronic communications channels for example the Internet.

Generating an impaired version of the material to be distributed provides a facility for a buyer to sample the material before acquisition, whilst discouraging the buyer from using the impaired material in an unauthorised way. If a buyer decides to acquire the material, the buyer client processor is provided with an impairment removal processor, which is arranged to remove the impairment from the material and to restore the material substantially to its original form. In some embodiments the impairments may be a "watermark", which for the example of video material would be a visible watermark.

The introduced data introduced in the material server provides enhanced security for the material whilst it is distributed. Preferably the introduced data is irremovable from the material.

The buyer may acquire the material following completion of a transaction. For example the buyer acquiring the material may purchase the material from a seller.

According to an embodiment of the first aspect of the invention, the material protection processor forms part of the material server and is operable to introduce protection data as the said introduced data into the material before the reversible impairment is introduced.

The protection data is configured to allow the detection of misuse of the material. For example the protection data may be arranged to identify the version of the material acquired by the buyer, the buyer, and/or the buyer client processor. The protection data may be an identification code word or words, known as a digital fingerprint. A digital fingerprint is introduced into material to the effect that it is difficult for a user to perceive the presence of the finger print. By identifying the code word(s) from the version of the material acquired by that buyer it is possible for the owner of the intellectual property rights to assert those rights in the material, should the material be used in a way which is contrary to the wishes of the owner. An example of a digital fingerprinting scheme is disclosed in [1].

Other imperceptible data which is additional to the protection data may be introduced into the material. That other data may be introduced at the material server before the impairment or at the client processor after impairment removal. The other data may identify the material, or be other metadata relating to the material and or be data identifying a person who has an interest (such as owner of the IPR) in the material. Preferably the other data includes a Universal Material Identifier (UMID) [4]. The other data may be embedded in the material using the embedding techniques disclosed in [2].

According to a second aspect of the present invention there is provided a system for protecting material comprising: first apparatus including a material impairment processor operable to introduce data into material to be distributed with the effect that the introduced data is at least difficult to perceive in said material; and second apparatus including an impairment reversing processor operable to reverse said impairment of said material to produce restored material wherein, the first apparatus is a camera-recorder for producing and recording video signals as the said material.

This allows a content provider, e.g. a cameraman to create material and protect it whilst transferring it to a user such as a studio.

Preferably, the introduced data is protection data as discussed above. The introduced data may alternatively be, or additionally be, other data as discussed above. The introduced data may be generated and introduced at the first or second apparatus.

In a third aspect of the present invention, there is provided apparatus including a material impairment processor operable to introduce a reversible impairment into material to be distributed, the reversible impairment providing an at least partially impaired previewable version of the material, a communications network including and operable to broadcast the stored material to a plurality of receivers; and at least one impairment reversing processor coupled to a respective one of the receivers and operable to reverse the said impairment of the material to produce restored material. In one embodiment the respective receiver may include a storage device, such as a video tape recorder, operable to store the distributed material. The impairment reversing processor may reverse the impairment from the material either before the material is stored by the storage device or as the material is reproduced from the storage device. Accordingly, the material may be previewed at a time later than the time at which the material was distributed.

Thus this aspect of the invention broadcasts impaired material to many potential users who choose whether or not to view the material they receive.

In an embodiment of this further aspect, if a user wishes, they remove the impairment using the impairment reversal processor. Preferably, the user must fulfil predetermined conditions, including for example, payment for the use of the material, before the removal data is transferred to them.

Broadcasting impaired material to users allows content providers to distribute their material to many potential users without the expense of sending video tapes or other data carriers to users. The impairment and the process of removing the impairment provides a way of ensuring to the content provider is paid for the content.

As will be appreciated from the foregoing discussion, in preferred embodiments the material may include one or more of audio material, video material and data material. A perceptible impairment may be added to audio.

The above-mentioned and other aspects and features of the present invention are defined in the appended claims.

BRIEF DESCRIPTION OF THE DRAWINGS

Embodiments of the present invention will now be described by way of example only with reference to the accompanying drawings, where like parts are provided with corresponding reference numerals, and in which.

DESCRIPTION OF PREFERRED EMBODIMENTS

Figure 1:
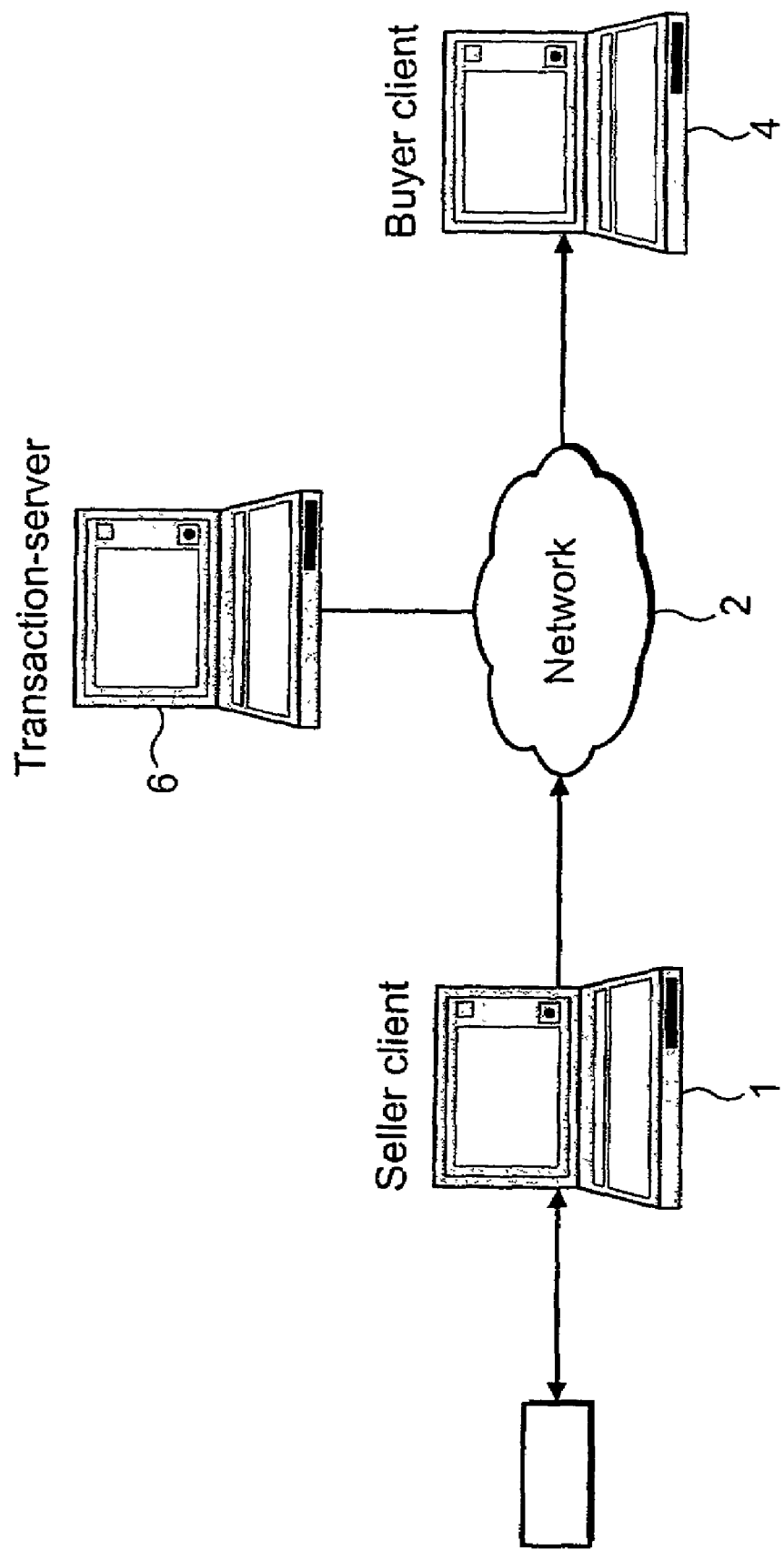
FIG. 1 is a schematic representation of a material distribution apparatus.

FIG. 1 presents a general arrangement for distributing media material from a seller to a buyer. As shown in FIG. 1, a seller client processor 1 is connected via a network 2 to a buyer client processor 4. The network 2 may include a communications network such as the Internet or an Intranet or any convenient communications network having sufficient bandwidth to communicate material to be distributed. Preferably the network is a broadband network. Also connected to the network 2 is a transaction server 6.

It is known to use "Digital Rights Management" software to protect material against misuse. Many companies provide such software, e.g. SealedMedia, Microsoft, InterTrust Technologies, and others. Such software, which is designed to be secure against unauthorised modification, allows the providers of material to securely distribute material over computer networks and to control the use of the material by users. Accordingly it will be appreciated by those skilled in the art to provide tamper proof software packages for facilitating the distribution of material to clients remotely via a network.

Generally as will be explained, the transaction server 6 provides a facility for distributing material such as audio/video material to buyer clients via the network 2. As will be explained, the distribution of the material is arranged such that the distributed material can be identified. To this end, data is embedded in the distributed material which can serve to identify either a version of the material distributed to the buyer client processor or the owner of the material. The owner can be for example the originator of the material, a licensee of the material or a distributor of the material or anyone who has, or acquires, Intellectual Property Rights in the material.

As will be explained shortly, an advantage is provided by the material distribution apparatus shown in FIG. 1 by arranging for the material to be impaired in a user perceivable way before it is distributed. The impairment may be for example a visible watermark. As such any person receiving the impaired material will be unlikely to want to use such material due to the presence of the visible watermark. However, the watermark is added in a reversible way, preferably using encryption, such that upon acquisition of the material, the impairment (watermark) can be removed by the buyer client processor 4 in order to restore the original material. Examples of techniques for introducing watermarks using encryption are disclosed in [3]. In a preferred embodiment, an invisible watermark is introduced into the material before the introduction of the visible watermark.

The buyer client processor 4 (see FIG. 3) includes a viewer which allows the buyer client to review the impaired material. If the buyer decides to acquire the video, and pays for it, the buyer is then allowed to remove the watermark and restore the original material. For that purpose, the buyer client includes a removal processor 90. According to a preferred embodiment, the buyer client processor also includes a material protection processor (100) included in the buyer client processor 4 which is arranged to introduce protection data into the recovered material. Protection data may be for example a digital fingerprint code word which identifies not only the version of the material but the buyer and/or the client processor 4 acquiring the material. Accordingly, any misuse of the material, such as copying, may identify the user that has misused the material. The processor(s) in the buyer client processor 4 for removing the visible watermark and introducing the protection data are secure against tampering by unauthorized people.

Figure 2:
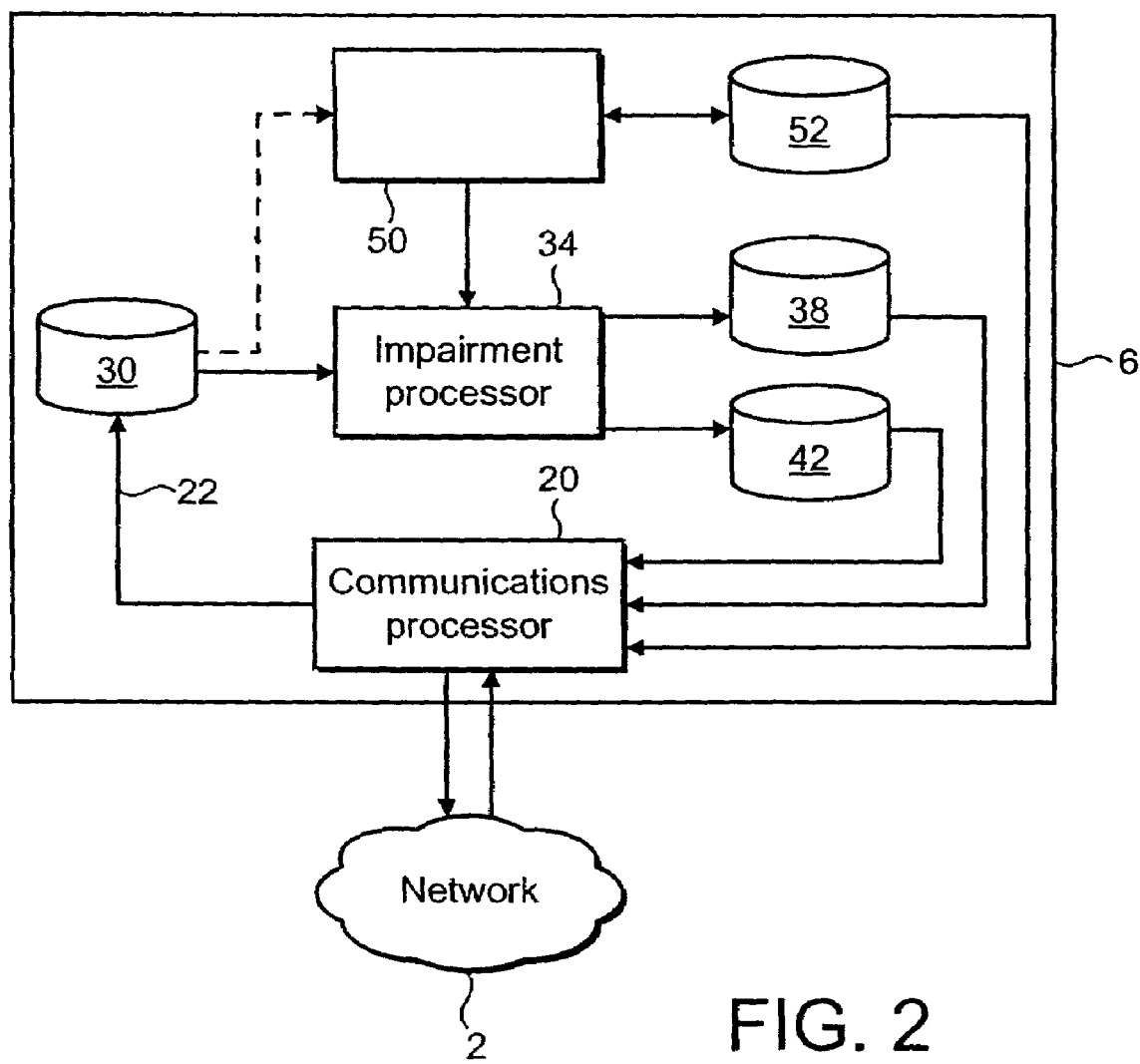
FIG. 2 is a schematic block diagram of a material transaction processor forming part of the material distribution apparatus shown in FIG. 1.

A more detailed block diagram of the transaction server 6 is shown in FIG. 2. As shown in FIG. 2, the transaction server 6 is connected to the network 2 via a communications processor 20. Connected to the communications processor via a channel 22 is an audio/video (A/V) store 30. Connected to the A/V store 30 is an impairment processor 34. The impairment processor 34 is connected to two further stores which are a store for impaired A/V material 38 and a store 42 for removal data. Store 42 stores decryption keys and other data needed to remove a watermark and restore the original material and which is generated by the impairment processor. Both the store 38 for impaired A/V material and the store 42 for removal data are connected to the communications processor 20. Optionally, the transaction server 6 may also include an invisible watermark processor 50 and a meta data store 52. The invisible watermark processor 50 is connected to the impairment processor 34. An output channel from the invisible watermark processor 50 is connected to the meta data store 52 which also has an output channel connected to the communications processor 20.

As mentioned above, the transaction server 6 provides a facility for distributing material to the buyer client processor 4 connected via the network 2. The transaction server receives via the communications processor 20, material to be distributed and which is sent to the buyer client processor 4 from e.g. from the seller client 1. The material to be distributed is then stored in the data store 30 which, for the present example embodiment stores A/V material. The impairment processor 34 is arranged to receive the A/V material from the data store 30 and introduce a perceivable impairment into the material which is commonly referred to as a visible watermark (WM). The watermarked A/V material is then stored in the second data store 38.

As explained in [3] (co-pending UK patent application number 0029852.1 (I-00-146)) a visible watermark can be introduced into material in a way which is reversible and which is applied in accordance with an encryption process. Accordingly, it would be difficult for a user receiving the visibly watermarked material to remove the visible watermark. However, the visible watermark can be removed in accordance with a decryption key and other removal data with the effect of removing the visible watermark and restoring the original material. Accordingly, a decryption key and other removal data (corresponding to the encryption key and other data used to visibly watermark the material) is stored in the removal data store 42. For distribution, the impaired material data store 38 and the removal data store 42 are connected to the communications processor 20. As will be explained, the removal data store may also include further security information such as fingerprint code words to be introduced into the material to indicate the version of the material and/or the buyer client processor 4 and/or the buyer who acquires the material.

Optionally, the transaction server 6 may also include the invisible watermark processor 50 which is operable to introduce an invisible watermark into the material before the material is forwarded to the impairment processor 34 to introduce the visible watermark. The invisible watermark processor 50 may include an arrangement for embedding metadata into the material. The metadata may include a UMID [4] or a unique identifier, which has an effect of identifying the material in which the metadata is embedded. The unique identifier is therefore communicated to and from a metadata store 52. The metadata store 52 is also connected to the communications processor 20.

Figure 3:
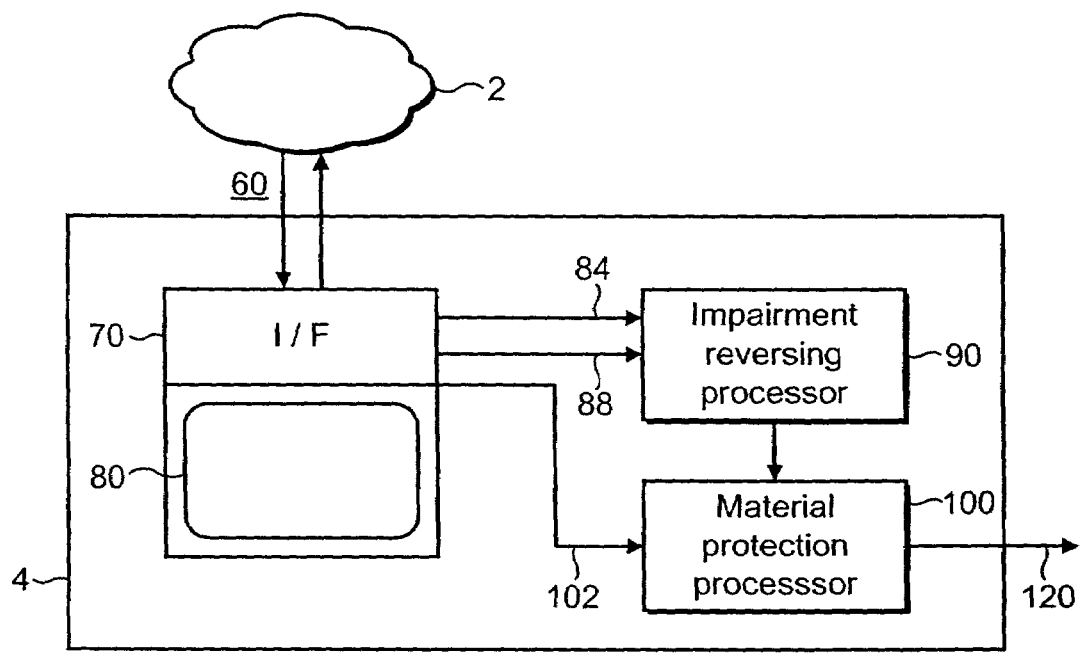
FIG. 3 is a schematic block diagram of a buying client data processor of the material distribution apparatus shown in FIG. 1.

A block diagram of the buyer client processor 4 is shown in FIG. 3. In FIG. 3, the buyer client processor 4 is shown connected to the network 2 via a communications link 60 which connects to a secure interface 70. The interface 70 includes a reproduction device 80. The interface is connected via first and second channels 84, 88 to an impairment reversing processor 90. An output of the impairment reversing processor 90 is fed to a material protection processor 100, which also receives an input from the interface 70.

A buyer wishing to acquire material may download the visibly watermarked material via the network 2 using the interface 70. The interface 70 is arranged to display the A/V material to the client albeit with the visible watermark present (and thus does not need to be secure). The display device 80 may also include other reproduction means such as audio reproduction apparatus. Having viewed the visibly watermarked material, the buyer may decide to acquire this material. Accordingly, the buyer can indicate via the interface 70 that he/she wishes to acquire the material. The interface 70 therefore communicates with the communications processor 20 in the transaction server 6. The communications processor 20 of the transaction server 6 is arranged to communicate the removal data. The removal data is securely communicated to the buyer client processor using for example known cryptographic techniques. The removal data is received via the interface 70 and fed via the connecting channel 84 to the impairment reversing processor 90. The impaired material is received via the second connecting channel 88 and the impairment reversing processor operates to reverse the visible watermarking process to the effect of removing or "washing" the visible watermark from the material to restore the original material. The material is then fed to the material protection processor 100.

In order to prevent the buyer from misusing the material, such as copying the material or using it in a way which is inconsistent with the wishes of the distributor, the impairment reversal processor and the material protection processor 100 are arranged to automatically and securely restore the original material and introduce the protection data into the material before making the material available to the buyer via an output channel 120. To this end, the material protection processor 100 may receive the protection data from the transaction server via the network 2, the protection data being sent in a secure manner. Alternatively, the protection data may be generated in the buyer client 4 by the protection processor 100.

An example of protection data, which may be introduced into the material, is an invisible watermark which is a digital identification code word or "fingerprint". An example of a digital finger printing scheme is disclosed in [2] and a brief description of embedding and recovering data is presented at the end of this specific description. In addition, for example, another invisible watermark may be embedded which is for example an identifier and/or metadata received from the metadata store 52 of the transaction processor 6. Preferably, the identifier is a unique identifier such as a UMID. Alternatively, the metadata and/or identifier may be generated within the material protection processor 100.

If a digital fingerprint is to be added to the material, then the identification code word (digital fingerprint) may be communicated as part of the protection data and received via the input channel 102. The material protection processor 100 therefore introduces the identification code word into the material, which identifies the buyer and/or version of the material acquired by the buyer client processor 4 and/or the processor 4 itself.

As will be appreciated, the arrangement of the buyer client processor 4 and transaction processor 6 to provide a means for reviewing visibly watermarked material and removing the visible watermark and then adding protection data to the recovered material provides a more secure arrangement for distributing the material to clients.

Figure 4:
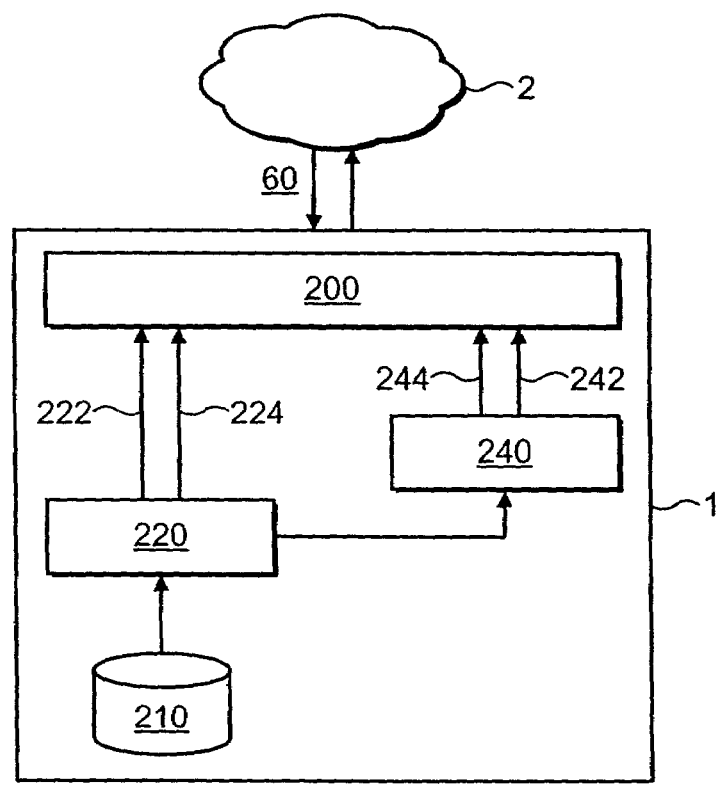
FIG. 4 is a schematic block diagram of a vendor client data processor of the material distribution apparatus shown in FIG. 1.

An example of a seller client processor 1 is shown in FIG. 4. In FIG. 4, the seller client processor 1 is connected to the network 2 via a communications processor 200. The seller client processor includes a material store 210, which for the example embodiment includes A/V material. The seller client processor may include an invisible watermark processor 220 and a visible watermark processor 240. The invisible watermark processor 220 and the visible watermark processor 240 operate substantially as described for the invisible watermark processor 50 and the impairment processor 34 as described for the transaction server 6 respectively and so repetition of the explanation will not be given. However, the presence of the invisible watermark processor 220 and the visible, watermark processor 240 provides a facility for introducing respectively the invisible and visible watermarks into the material in the seller client processor rather than in the transaction server 6. Accordingly, therefore a unique identifier which is embedded as part of an invisible watermark or other meta data is communicated to the communications processor 200 and then to the transaction server 6 for storage in the meta data store 52 via connecting channels 222, 224. Correspondingly, the impaired material including the visible watermark is fed from a connecting channel 242 with the decryption key and other removal data via a connecting channel 244 to the communications processor 200 for communication via the network to the transaction server 6. The seller client processor may interact with the transaction processor 6 to generate the invisible watermark and the visible watermark.

As will be appreciated therefore in combination the seller client processor 1 and the transaction server 6 form a material server and in other embodiments, the seller client processor and the transaction server may form a unified material server. In summary, the operation of the material distribution apparatus shown in FIG. 1 is shown in FIG. 5 and will be described with reference to a flow diagram shown in FIG. 6.

Figure 5:
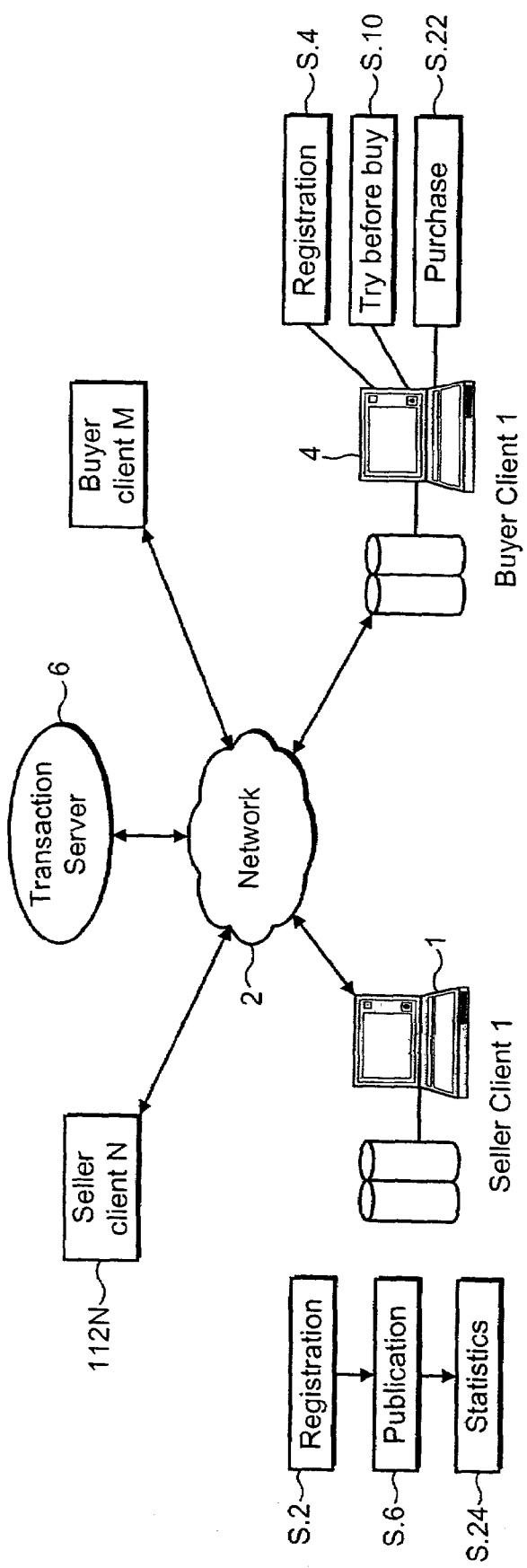
FIG. 5 is a part schematic part flow diagram illustrating a process whereby a client acquires material from the material distribution apparatus shown in FIG. 1.
Figure 6:
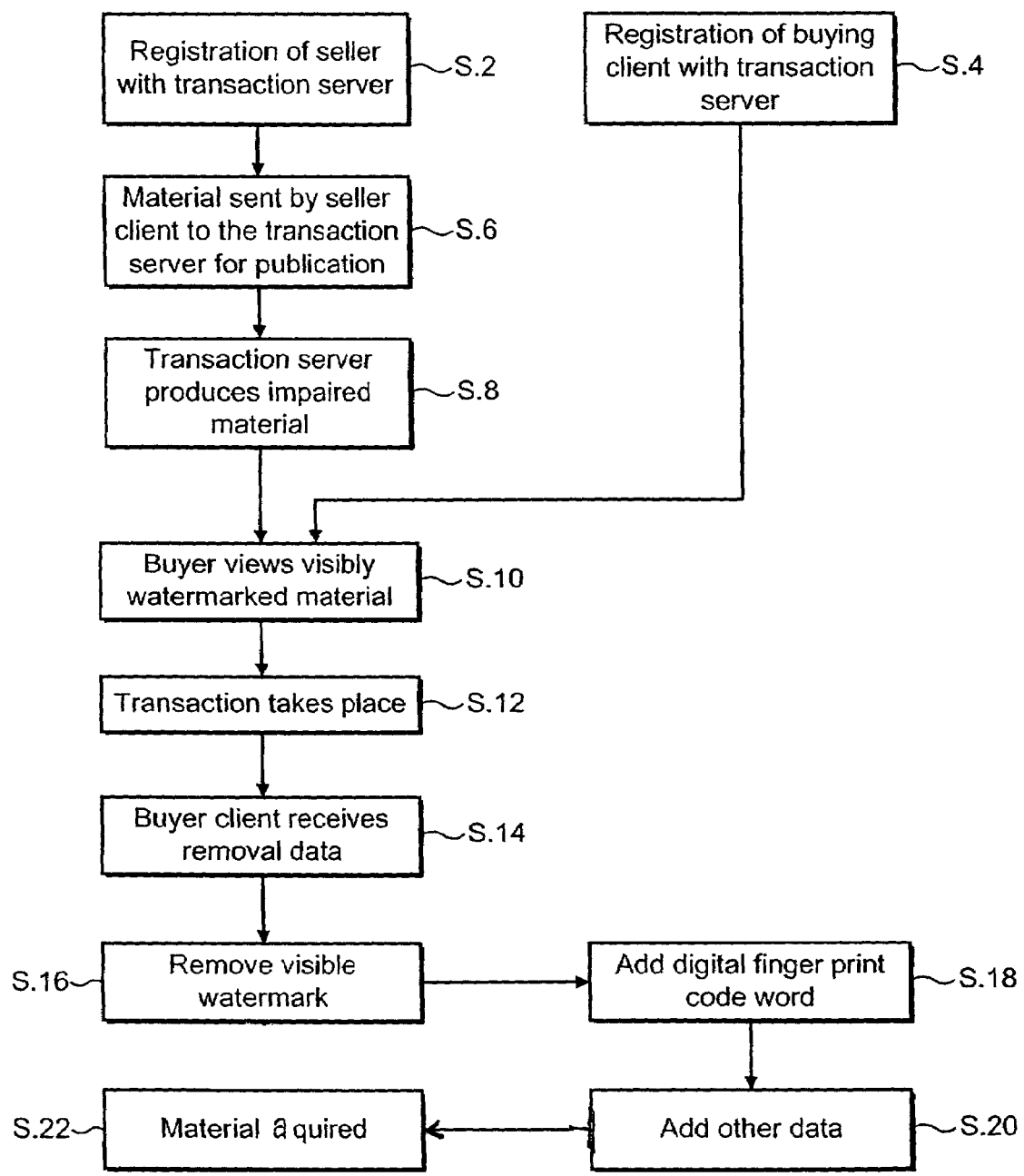
FIG. 6 is a flow diagram illustrating a process of acquiring material from the material distribution apparatus shown in FIG. 1.

As shown in FIG. 5, several buyer and seller client processors may be connected to the network 2 and may have access to the transaction server 6. As shown in FIGS. 5 and 6, the first step of a seller and a buyer is to register with the transaction server 6. Registration may require depositing funds and/or providing bank details in order that a transaction can be performed; other information may be required for registration. As shown in FIG. 6, the first step S2, S4 is for the seller to register with the transaction server using the seller client processor 1 and for the buyer to register with the transaction server using the buyer client processor 4. At step S6, the A/V material is provided by the seller client 1 to the transaction server by communicating the A/V material to the transaction server. At step S8, the transaction server 6 produces an impaired version of the material by adding the visible watermark. The buyer then views the visibly watermarked material at step S10 using the buyer client processor 4 by accessing the transaction server via the network.

If the buyer then decides that he/she wishes to acquire the material then a transaction takes place. The transaction may be for example an exchange of money by transfer of funds from the buyer's account to the seller's account. Following completion of the transaction at step S12, the buyer receives, at S14, via the network the removal data needed to remove the visible watermark and restore the original material. At step S16, the visible watermark is removed by the impairment reversing processor and the original material is restored. A digital code word which acts as a fingerprint to identify the version of the material distributed to the buyer client is added at step S18 by the material protection processor. Optionally at step S20, an invisible watermark is added to the A/V material, which may include a unique identifier of the originator of the material. At step S22, the buyer acquires the protected material without the visible watermark.

As will be appreciated the buying client processor 4 may be a secure apparatus in that the apparatus may be closed to the buyer and include tamper-proof features to prevent the buyer from accessing and disrupting the introduction of the protection data into the material and to prevent the buyer from accessing the removal data.

A further step indicated as S.24 shown in FIG. 5 involves generating statistical data for the seller. The statistical data may include, inter alia, for example the number of times potential buyers have received the impaired material, the rate of acquisition of the material and financial data such as sales prices.

Further Embodiments

The embodiments described above with reference to FIGS. 1 to 6 provide a material distribution apparatus in which the material protection processor forms part of the buyer client processor. However, in alternative embodiments the material protection processor may form part of the transaction server 6. As such, for example, the invisible watermark processor 50 of the server 6 may form the material protection processor, in which protection data may be introduced into the material before it is transmitted to the buyer client processor.

In a modification of the system of FIG. 5 the seller client processor 1 and the transaction-server 6 are coupled via the communications network 2 and the system is configured so that visibly watermarked material is transferred from said seller client processor 1 to the or each buyer client processor 4 via the communications network 2, bypassing the transaction server 6. In one version of this embodiment the buyer client processor 4 is operable to receive the removal data separately from the material. For example the seller client is operable to provide the removal data to the transaction server 6, and the buyer client processor is operable to receive the removal data from the transaction server 6 once the buyer has paid for the material.

Figure 7:
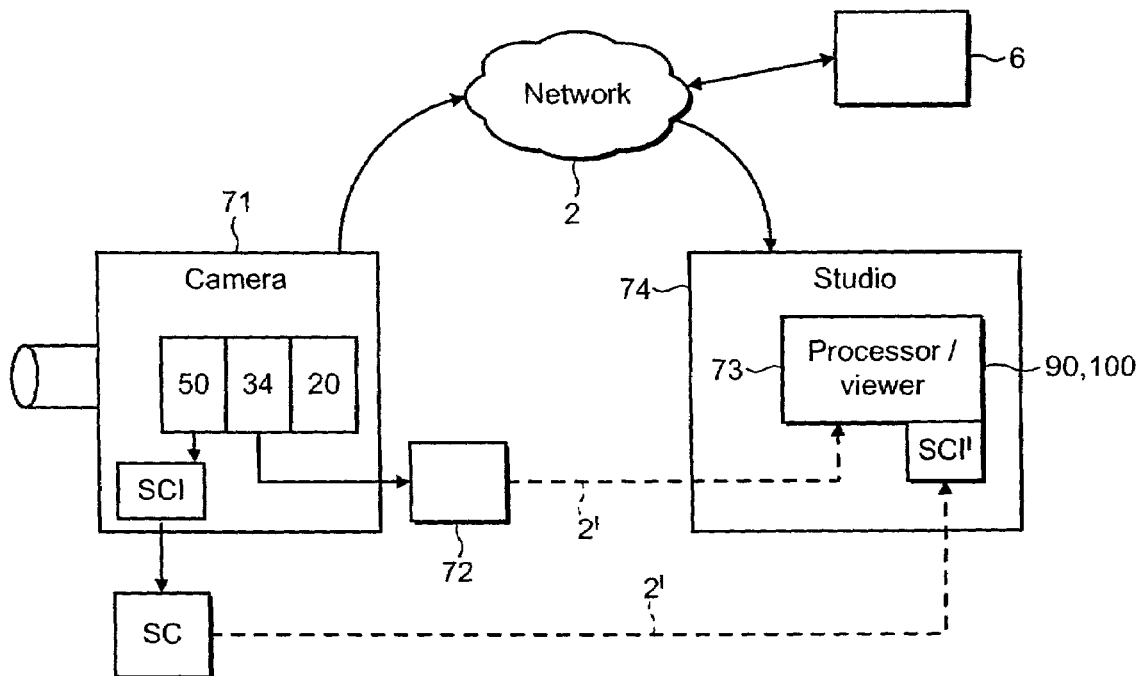
FIG. 7 is a schematic diagram of a further system in which the present invention may be practised.
Figure 8:
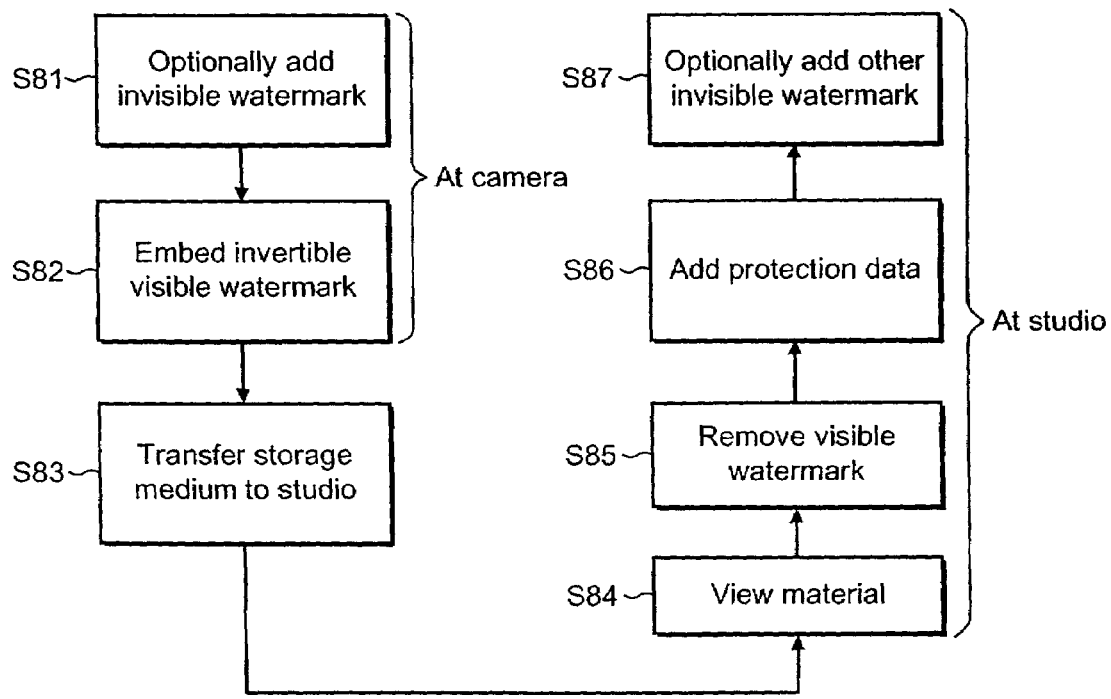
FIG. 8 is a flow diagram illustrating the operation of the system of FIG. 7.

Further System of FIGS. 7 and 8.

Referring to FIG. 7, a camera-recorder 71 is used to create audio/video material, which is stored on a data storage medium, e.g. tape 72. The camera-recorder 71 includes an impairment processor 34 and optionally also an invisible watermark processor 50 as described above. It may also include a communications processor 20 as described above for communicating with a network 2 also as described above. The impairment processor 34 introduces an invertible impairment into the video recorded by the camera. The impairment processor also generates removal data with which the impairment may be removed and the original video restored. The removal data may be downloaded onto a smart card SC via a smart card interface SCI or to a transaction server 6 via the communications processor 20 and the network 2.

Referring to FIG. 8, at the camera, video is recorded and at step S81 an invisible watermark is optionally introduced in to the video using the processor 50. The visible impairment is introduced at step S82 using the impairment processor 34. If an invisible watermark is provided, the impairment may be introduced after the invisible watermark. The removal data is generated and stored on the smart card or downloaded to the server 6 in a secure manner as known in the art.

The impaired (and invisibly watermarked) video is stored on a tape 72 and at step S83 physically transferred by a transmission channel 2' to a studio 74. The channel 2' may be the postal service, a courier, or simply the camera operator carrying the tape.

Referring to FIGS. 7 and 8, the studio 74 contains apparatus for reviewing (S84) the video on the tape and a processor 90 as described above for removing the impairment and restoring the original video (S85). The studio may also include a processor 100 for introducing the protection data and preferably also metadata as described above (S86, S87). The removal data is transferred to the processor 100 using the smart card which downloads the removal data via a smart card interface SCI' or the removal data is transferred in a secure manner via the network 2 from the server 6.

Figure 9:
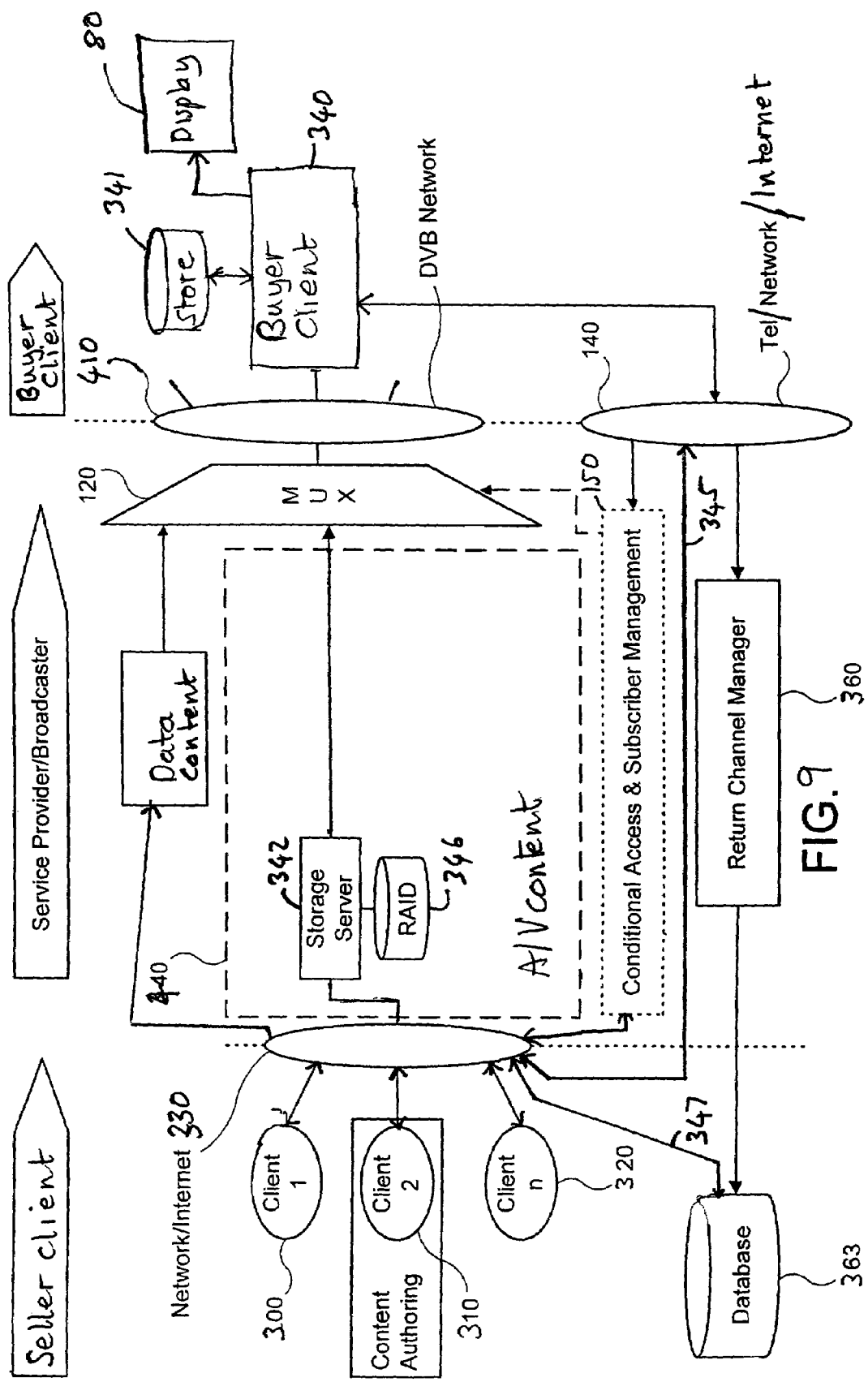
FIG. 9 is a schematic representation of another material distribution apparatus.
Figure 10:
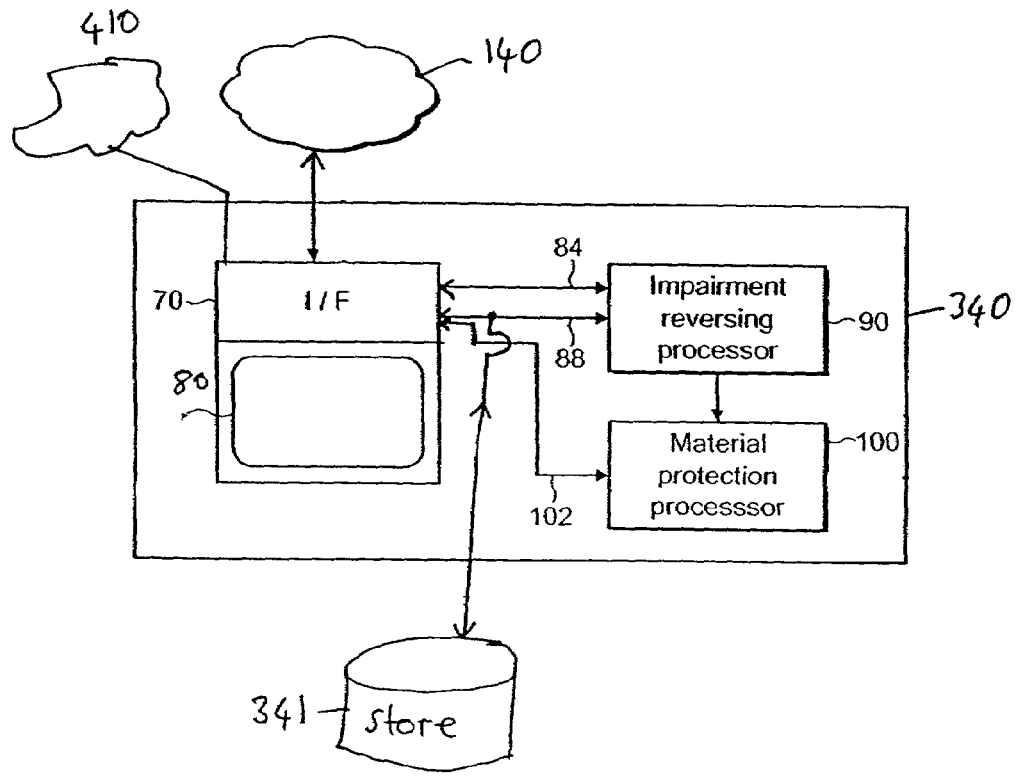
FIG. 10 is a schematic block diagram of a buyer client processor used in the apparatus of FIG. 9.
Figure 11:
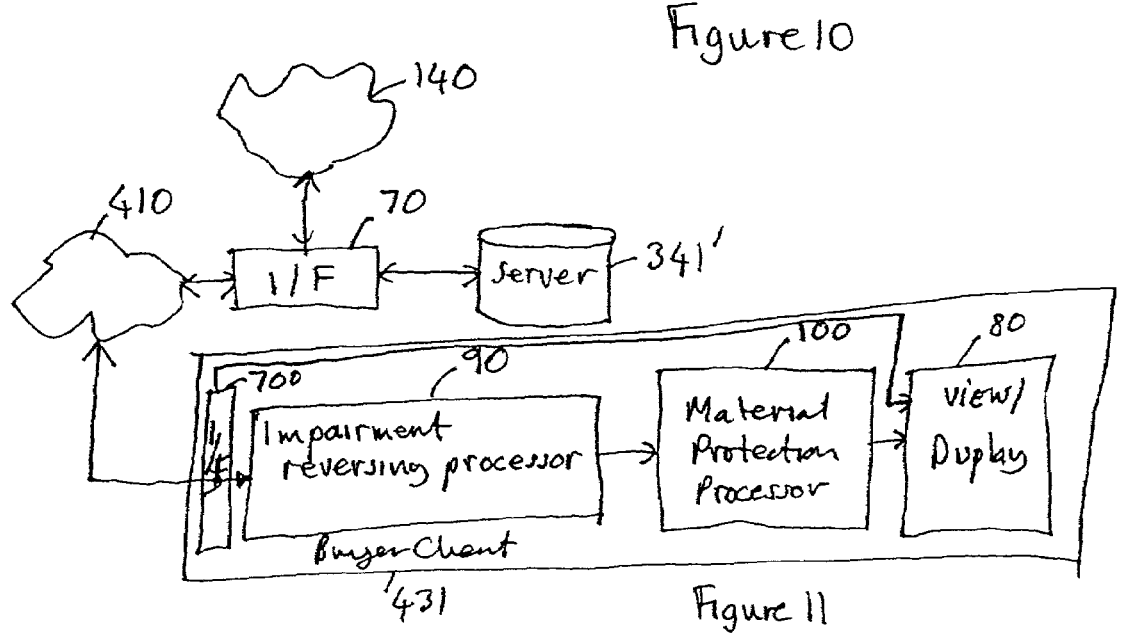
FIG. 11 is a schematic block diagram of another buyer client processing system useful in the apparatus of FIG. 9.

System of FIGS. 9, 10 and 11.

The systems of FIGS. 1 to 6 may operate in the so-called "pull-mode" in which material is stored in a server load viewed in response to a buyer accessing the server 6.

The system of FIGS. 9, 10 and 11 operates, at least in part, in the "push-mode" n which material is sent, e.g. broadcast to may potential buyers and the individual buyers choose whether to view or not.

FIG. 9 of the accompanying drawings schematically illustrates a digital broadcasting arrangement as described in GB-A-2361154 and relating to the broadcast of both "conventional" audio/video (A/V) programme content and also digital data content.

In FIG. 9, the content is broadcast by a broadcast network (e.g. a cable, terrestrial or broadcast network) 410 to a plurality of end-users each having a buyer client 340. The broadcast network may for example operate in accordance with a DVB standard, the content being broadcast in the form of a DVB stream. The broadcast content is decoded from the DVB stream by the buyer client which includes a suitable decoder.

A-V programme content sourced from a seller client 300, 310, 320 is packed and passed to a multiplexer 120. The A-V programme content may be packed for example in accordance with the MPEG-2 standard. In alternative embodiments the A-V content may be packed according to the MPEG-4 standard or indeed any other standard suitable for transport. The multiplexer 120 may also receive data content. The multiplexer 120 may also receive conditional access information from a conditional access and subscriber management unit 150. The multiplexer operates to a multiplex all of this in to a DVB data stream using conventional DVB techniques (here, reference is made to standard textbooks on MPEG-2 such as "Digital Television", H Benoit, 1997, ISBN 0 340 69190 5). The DVB data stream is broadcast over the broadcast network 410 and decoded at the buyer client 340, again by conventional techniques.

A reverse connection from the buyer client, via a telecommunications network 140 such as a public utility network, the Internet or other network allows subscriber management information to be obtained and supplied to the conditional access and subscriber management unit 150—for example, including requests for access to conditional access programming. The reverse connection also allows billing to be made to each subscriber, in respect of programme content received or other transactions (e.g. home shopping) by return channel management unit 360.

FIG. 9 shows a number of content-originating "seller client systems" 300, 310, 320 connected via a network 320 such as the Internet, a dial-up modem or ISDN connection, a dedicated data transfer channel or the like, to a broadcast "server system" 440.

The techniques to be described below relate to the origination of conventional A/V content but could relate to data content origination or other types of content.

The output of the server system 440 is connected to the multiplexer 120 described above, and from there to the broadcast network 410 for broadcast to the buyer client. The same entity may operate the server system 240 and the broadcast network 410 or the server system and the broadcast network 410 may be operated by different entities.

The server system comprises a storage server 342 having a fault-tolerant RAID disk array 346. The RAID disk array is one example of a storage medium and it will be appreciated that other storage media are envisaged. Two storage servers maybe used to provide redundancy in case of a fault developing during a broadcast. The storage server 342 controls the storage of incoming programme content into the RAID array 346 and the subsequent reading out of the programme content the from RAID array for broadcast. In controlling the reading out of the content it makes use of scheduling information received from the seller client systems, defining which content is to be read out and broadcast at what time.

The seller client systems 300 . . . 320 are operable to originate content for broadcast and associated scheduling information to control the time and nature of the broadcast of that content. Each client system comprises a computer workstation having a data connection and running appropriate software to carry out the functions described below.

A database 363 may be provided to allow return channel information such as access or usage figures to be made accessible to the seller client system users.

The interaction of the client systems 300 . . . 320 with the server system 440 may be as follows.

After an appropriate commercial relationship has been established between the corporate entity operating a seller client system and a corporate entity operating the server system 300 . . . 320. The server system 440 first issues an "access permission" to the client system 300 . . . 320. The access permissions issued by the server system 440 are also stored by the storage server 342 for later use.

The access permission basically defines three things; the name (or logical identifier) of the seller client system, a time period for broadcast and a bandwidth for the client system's use during that period. It would normally be the case that the entity responsible for the client system would be expected to pay the entity operating the server system in dependence on the length of time and the bandwidth of the access permission. In one arrangement, the entity responsible for the client system stipulates a service level, for example, Premium, Normal, Budget. The entity operating the server system then performs bandwidth/time allocation according to commercial requirements within the specified service level agreements.

The seller client system 300 . . . 320 provides the following information back to the server system 440:

User verification and authorisation data such as a password previously issued by the server system Content for broadcast Scheduling data defining the temporal nature of the broadcast (see FIG. 5 below)

These items are received by the server system 440 via the connection 330. The user verification data is checked to identify the user, to verify its authority to broadcast programme content via that server, and to establish whether any access permissions have been issued to that client system. The content is stored by the RAID array 346 under the control of the storage servers 342. The scheduling data is stored in the storage server 342.

At the appropriate time defined by the scheduling data supplied from the seller client system, as long as that time lies within the range defined by a previously issued access permission for that client, the content is read from the RAID array 346 and, under control of the storage server 342, passed to the broadcast network 410.

The seller client 300, 310, 320 may be as shown in FIG. 4 and described hereinbefore. The communications processor 200 connects with the network 330 of FIG. 9. As described with reference to FIG. 4, the visible watermark processor 240 introduces a visible watermark into the material to produce impaired material. An invisible watermark may optionally be introduced into the material by the invisible watermark processor 220.

The decryption key and other visible watermark removal data may be fed via the channel 244 and the communications processor 200 and the network 330 to the conditional access and subscriber management system 150 which also connected to the network 330, 140.

Alternatively, the description key and other watermark removal data may be stored in the seller client.

The seller client may be a camera 71 as shown in FIG. 7 which transfers removal data to the conditional access and subscription management system 150 via network 330 for example.

The buyer client 340 of FIG. 9, which may be one of several buyer clients able to receive content via the broadcast network 410, may be as shown in FIG. 10.

The client 340 of FIG. 9 is a modification of the client of FIG. 4, features of which are indicated by the same reference numerals in both figures.

The client 340 receives audio/video content, which is perceptibly (e.g. visibly) watermarked and may also be imperceptibly watermarked, via the broadcast network 410. Then content is received by a suitable receiver (not shown) and fed to an interface 70.

The user views the watermarked content using the viewer 80 and/or the watermarked content is sent by the interface 70 to a store 341 for later viewing. The store 341 may comprise several storage devices or be one of several storage devices connected to the interface 70. The or each store 341 may be a hard disk, or comprise many hard disks, or be a RAID arrangement.

Once the user decides to acquire the content received from the network 410, they indicate their decision via the interface 70 and the network 140.

Their decision to acquire the content is communicated to the conditional access and subscriber management system 150 in one example of invention, and directly to the seller client 300, 310, 320 in another example of the invention. Assume, for ease of explanation, the decision is communicated to the system 150. The system 150 ensures that the user complies with certain conditions, for example they have paid for the material and fulfilled other conditions. The system 150 which has received the removal data from the seller client as described above then releases to the client 340 the removal data needed to remove the visible watermark. The removal data is communicated via the network 140 in a secure manner. The impairment receiver processor 90 and the protection processor 100 operate as discussed above with reference to FIG. 3 to remove the visible watermark and optionally to add invisible protection data.

The material may then be viewed free of the visible watermark on the display 80. Alternatively to the material may be used in some other way, e.g. stored in the store 341, processed in a studio or sent to subscribers on a cable network, in accordance with any conditions agreed by the user when registering for the release of the removal data.

In addition to controlling the release of removal data, the conditional access system 150 may control the access of the buyer client 340 to the visibly watermarked material in the same way as controlling access to any other conditional access material.

The user of the buyer client 340 has been assumed in the forgoing to be the user of the material.

However, the buyer client 340 may be: a studio, which processes the material for distribution in a modified form to other users; the head-end of a cable network which makes the material available to subscribers; a server via which other users linked to the server via the network 140 can access the material. The network 140 may be a peer-to-peer network, an Intranet, an Extranet or any other network for example.

In the case of a server, the other users may access only visibly watermarked material and the server acts as a gateway for the other users to access, individually, the removal data subject to meeting the conditions for receiving the removal data. FIG. 11 illustrates, schematically, such a system. A communication interface 70 couples a server 341' to the broadcast network 140 and to a communications network 410. The server stores impaired material received from the broadcast network 140. A buyer client 431 includes an interface 700 via which a buyer communicates with the server 341 to access impaired material. The buyer client includes an impairment reversing processor 90 and a material protection processor 100 and a display or viewer 80 as described hereinbefore. The user of the buyer client obtains removal data via the network 410 as described above, e.g. from a conditional access system 150 or from a seller client such as 300.

The user may use the display or receiver 80 to view the impaired material before arranging the removal of the impairment.

A user having the buyer client 340 or 431 may be a television station, an advertising company, a movie production company, a pub, club, cinema, or any other organisation.

A user of the seller client may be an author of original content or a person or organisation which has bought content or bought the right to distribute content uses the apparatus of FIG. 9 or any other organisation. As described above the user of the seller client may have to pay the service provider/broadcaster to use the server system 440 conditional access and broadcast network 410.

Users of the visibly watermarked material may need to pay for:

a) conditional access to visibly watermarked material; and
b) access to the removal data.

Some visibly watermarked material may be provided free of charge. Some visibly watermarked material may be subject to a charge.

It is envisaged that the fee for providing the removal data may be fixed by the seller. Alternatively, an auction could be set up in known manner.

The broadcast material may include metadata describing the material, for example according to genre. The buyer client may detect such metadata and record in the store 341 or server 341 of FIG. 10 or 11 material selected according to such metadata.

Identifying Impaired Broadcast Material

Especially where many different examples of material from many different sellers are broadcast, each with different impairments, and thus requiring different removal data, it is necessary to identify the individual impaired material to access the removal data for removing the impairment.

A UMID [4] may be used to uniquely identify each example of materials. The UMID may be embedded in the broadcast material or otherwise associated with the material in a way allowing the buyer client to identify the received material and, subject to fulfilling predetermined conditions as described above, access the appropriate removal data.

Embedding and Recovering Data

A short explanation will now be given of a process through which data may be embedded and recovered from material. This process is suitable for embedding invisible watermarks in material and embedding identification code words to form digital finger prints. Further details are provided in [1].

Generally, an example arrangement for embedding data may comprise a pseudo-random sequence generator, a modulator, a Wavelet transformer, a combiner and an inverse Wavelet transformer.

The pseudo-random sequence generator produces a Pseudo Random Bit Sequence (PRBS), which is fed to the modulator. The modulator is operable to modulate each copy of a PRBS, with each bit of payload data to be embedded. In preferred embodiments, the data is modulated by representing the values of each bit of the PRBS in bipolar form ('1' as +1, and '0' as −1) and then reversing the polarity of each bit of the PRBS, if the corresponding bit of the payload data is a '0' and not reversing the polarity if the corresponding bit is a '1'. The modulated PRBS is then embedded in the material in the transform domain. The Wavelet transformer converts the image into the Wavelet domain. The combiner embeds the payload data into the image, by adding, for each bit of the modulated PRBS a factor $\alpha$ scaled by $\pm 1$, in dependence upon the value of the modulated PRBS. Each coefficient of a predetermined region of the Wavelet domain image is encoded according to the following equation:

$$X'_i = X_i + \alpha_n W_{n,i}$$

Where $X_i$ is the i-th wavelet coefficient, $\alpha_n$ is the strength for the n-th PRBS and $W_{n,i}$ is the i-th bit of the n-th modulated PRBS of the payload data to be embedded in bipolar form. Therefore the image is converted from the spatial to the Wavelet transform domain, the combiner adds the PRBS modulated data to the Wavelet domain image, in accordance with application strength $\alpha$ and the image is then inverse Wavelet transformed.

The modulated PRBS effectively forms a spread spectrum signal representing the payload data. As a spread spectrum signal, a reduction can be made in the strength of the data to be embedded in the image. By cross-correlating the data in the transform domain image to which the modulated PRBS has been added, with a copy of the PRBS, a correlation output signal is produced with a so called correlation coding gain which allows the modulated data bit to be detected and determined. As such, the strength of the data added to the image can be reduced, thereby reducing any perceivable effect on the spatial domain image. The use of a spread spectrum signal also provides an inherent improvement in robustness of the image because the data is spread across a larger number of transform domain data symbols.

Therefore, in order to recover the embedded data from the image, a Wavelet transformer converts the watermarked image into the transform domain. The Wavelet coefficients to which the PRBS modulated data were added by the combiner are then read from the Wavelet bands. These Wavelet coefficients are then correlated with respect to the corresponding PRBS, which was used to embed the data. Generally, this correlation is expressed as the equation below, where $X_n$ is the n-th wavelet coefficient and $R_n$ is the R-th bit of the PRBS generated by the pseudo random sequence generator.

$$C_n = \sum_{i=1}^{s} X_{sn+i} R_i$$

The relative sign of the result of the correlation $C_n$ then gives an indication of the value of the bit of the embed data in correspondence with the sign used to represent this bit in the embedder.

Various modifications may be made to the embodiments herein before described without departing from the scope of the present invention.

REFERENCES

[1] "Collusion—Secure Fingerprinting for Digital Data", by Dan Boneh and James Shaw, *IEEE Transactions on Information Theory*, volume 44 no. 5, September 1998".

[2] Co-pending UK patent applications numbers 0029859.6, 0029858.8, 0029863.8, 0029865.3, 0029866.1 and 0029867.9.

[3] Co-pending UK patent application number 0029852.1 and 0029850.5.

[4] "UMIDS" J. Wilkinson, SMPTE *Journal* March 2000.

The invention claimed is:

1. A video material distribution system for providing video material to be distributed via a network, comprising:
    a material server operably linked to the network including:
        a data introduction processor operable to introduce data into video material to be distributed, said introduced data is not perceivable upon presentation of the video material,
        a distribution client processor configured to negotiate the exchange of video material to be distributed via the network, the video material to be distributed being accessible to the server;
        a material impairment processor operable to introduce a reversible visible impairment into said material prior to distribution, the material impairment processor providing the reversible visible impairment of said video material using an impairment algorithm dependent on an encryption key, the impairment processor producing removal data corresponding to the algorithm; and
    at least one client processor operably linked to the network and configured to negotiate the exchange with the distribution client processor to receive the video material to be distributed including both the reversible visible impairment and the introduced data together therein when distributed, and to receive the removal data separately from the said video material, wherein each of said at least one client processor includes
        an impairment reversing processor operable to reverse said visible impairment of said video material to produce client restored material in accordance with said removal data.

2. A video material distribution system as claimed in claim 1, wherein said introduced data includes protection data configured to allow the detection of misuse of the video material.

3. A video material distribution system as claimed in claim 1, wherein said data introduction processor is arranged to introduce protection data which serves to identify one or more of a version of said video material, the client processor; and the acquirer of the video material.

4. A video material distribution system as claimed in claim 1, further comprising:
    a further data introduction processor operable to introduce data into said restored video material, said introduced data is not perceivable upon presentation of the video material.

5. A video material distribution system as claimed in claim 1, wherein said data introduction processor is arranged to introduce other data which identifies a person having an interest in the video material and/or which is metadata relating to the video material.

6. A video material distribution system as claimed in claim 5, wherein said other data includes a UMID.

7. A video material distribution system as claimed in claim 5, wherein a said person having an interest in the video material is the originator of said material and/or the owner of said material, the distributor, licensee or any other party having an interest in the intellectual property rights of said material.

8. A video material distribution system as claimed in claim 1, wherein said client processor includes a viewer operable to receive data said impaired material from said communications network and to reproduce said impaired material.

9. A video material distribution system as claimed in claim 8, wherein said apparatus includes a display device for displaying said impaired video material.

10. A video material distribution system as claimed in claim 1, further comprising:
    a further server, the distribution client processor being operable to provide the said removal data to the further server, and the said client processor being operable to receive the removal data from the further server.

11. A video material distribution system as claimed in claim 1, wherein said material server further comprises:
    a transaction-server coupled via said communications network, said distribution client processor being operable to communicate said video material to said transaction-server for distribution.

12. A video material distribution system as claimed in claim 11, wherein said distribution client processor further comprises:
    a communications processor operable to communicate, to said transaction processor, said video material into which the data has been introduced and which is visibly impaired.

13. A video material distribution system as claimed in claim 12, wherein said transaction server includes a processor operable to store said visibly impaired video material, wherein, in response to a request from said client processor to acquire said video material, said secure server is operable to communicate said visibly impaired video material to the client processor.

14. A video material distribution system as claimed in claim 1, wherein said communications network is a LAN or WAN.

15. A video material distribution system as claimed in claim 9, wherein said introduced data is protection data serving to identify one or more of a version of said video material; an acquirer of said video material; and the at least one client processor.

16. A video material distribution system as claimed in claim 9, wherein the introduced data includes other data which is metadata relating to the material.

17. A video material distribution system as claimed in claim 9, further comprising:
a further server, the distribution client processor being operable to provide the said removal data to the further server, and the said buyer client processor being operable to receive the removal data from the further server.

18. A video material distribution system according to claim 1, said distribution client processor further comprising:
a communications processor operable to communicate said impaired video material and said removal data to said transaction processor.

19. A video material distribution system as claimed in claim 18, wherein data includes protection data configured to allow the detection of misuse of the video material.

20. A video material distribution system as claimed in claim 19, wherein said data introduction processor is arranged to introduce protection data which serves to identify one or more of: a version of said material; the client processor; and the acquirer of the video material.

21. A video material distribution system as claimed in claim 18, wherein said data introduction processor is arranged to introduce other data which identifies a person having an interest in the video material and/or which is metadata relating to the video material.

22. A video material distribution system as claimed in claim 21, wherein said other data includes a UMID.

23. A video material distribution system as claimed in claim 18, which is operable to provide said video material to a material server of the material distribution system.

24. A video material distribution system as claimed in claim 18, configured so that said video material is transferrable from said seller client to the or each said client processor via said communications network.

25. A video material distribution system as claimed in claim 1, wherein said distribution client processor is operable to provide the removal data to a further server.

26. A method of distributing material via a network comprising:
introducing data into video material to be distributed with the effect that the introduced data is not perceivable upon presentation of the video material,
introducing a reversible visible impairment into the video material to be distributed, the video material to be distributed including the introduced data together with the reversible impairment therein when distributed, prior to distribution, the material impairment processor providing the reversible video visible impairment of the video material using an impairment algorithm dependent on an encryption key;
producing removable data corresponding to the algorithm;
negotiating the exchange of video material to be distributed via the network, the video material to be distributed being accessible to a server;
negotiating the exchange to receive the video material to be distributed and to receive the removable data separately from the video material via at least one client processor;
distributing said impaired video material and removal data, separately to at least one client processor, and
reversing said impairment of said video material to produce restored video material in accordance with said removal data.

27. The method according to claim 26, wherein the introduced data is protection data configured to allow detection of misuse of the restored material.

28. The method according to claim 27, wherein said introduced data is protection data which serves to identify one or more of: a version of said video material; the at least one client processor; and the acquirer of the video material.

29. A system for protecting video material distributed via a network, comprising:
a first apparatus including;
a data introduction processor operable to introduce data into video material to be distributed, said introduced data is not perceivable upon presentation of the video material,
a distribution client processor configured to negotiate the exchange of video material to be distributed via the network, the video material to be distributed being accessible to the first apparatus;
a material impairment processor operable to introduce a reversible visible impairment into said material prior to distribution, the material impairment processor providing the reversible visible impairment of said video material using an impairment algorithm dependent on an encryption key, the impairment processor producing removal data corresponding to the algorithm; and
a second apparatus including:
at least one client processor operably linked to the network and configured to negotiate the exchange with the distribution client processor to receive the video material to be distributed including both the reversible visible impairment and the introduced data together therein when distributed, and to receive the removal data separately from the said video material, wherein each of said at least one client processor includes
an impairment reversing processor operable to reverse said visible impairment of said video material to produce client restored material in accordance with said removal data.

30. A system according to claim 29, wherein the second apparatus includes a further data processor operable to introduce data into video material, said introduced data being introduced into said video material with the effect that the introduced data is at least difficult to perceive in said video material.

31. A system according to claim 29, wherein the first apparatus is a camera-recorder for producing and recording video signals as the said material.

32. A system for protecting material distributed via a network, comprising:
a first apparatus including:
a data introduction processor operable to introduce data into video material to be distributed, said introduced data is not perceivable upon presentation of the video material,
a distribution client processor configured to negotiate the exchange of video material to be distributed via the network, the video material to be distributed being accessible to the first apparatus;
a material impairment processor operable to introduce a reversible visible impairment into said material prior to distribution, the material impairment processor providing the reversible visible impairment of said video material using an impairment algorithm dependent on an encryption key, the impairment processor producing removal data corresponding to the algorithm; and
a second apparatus including:
at least one client processor operably linked to the network and configured to negotiate the exchange with the distribution client processor to receive the video material to be distributed including both the reversible visible impairment and the introduced data together therein when distributed, and to receive the removal data separately from the said video material, wherein each of said at least one client processor includes an impairment reversing processor operable to reverse said visible impairment of said video material to produce client restored material in accordance with said removal data wherein, the first apparatus is a camera-recorder for producing and recording video signals as the said material.

33. A system according to claim 32, wherein the impairment processor generates impairment removal data.

34. A system according to claim 33, further comprising:
a communications channel for transferring the removal data from the first apparatus to the second apparatus, the first and second apparatus each having a communications interface with the network.

35. A system according to claim 33, wherein the first apparatus has an interface for transferring the removal data to a secure data carrier, and the second apparatus has an interface for receiving the removal data from a secure data carrier.

36. A video material distribution system for providing video material to be distributed via a network, comprising:
an apparatus including:
a data introduction processor operable to introduce data into video material to be distributed, said introduced data is not perceivable upon presentation of the video material,
a distribution client processor configured to negotiate the exchange of video material to be distributed via the network, the video material to be distributed being accessible to the apparatus;
a material impairment processor operable to introduce a reversible visible impairment into said material prior to distribution, the material impairment processor providing the reversible visible impairment of said video material using an impairment algorithm dependent on an encryption key, the impairment processor producing removal data corresponding to the algorithm; and the reversible impairment providing an at least partially visually impaired previewable version of the video material; and
at least one client processor operably linked to the network and configured to negotiate the exchange with the distribution client processor to receive the video material to be distributed including both the reversible visible impairment and the introduced data together therein when distributed, and to receive the removal data separately from the said video material, wherein each of said at least one client processor includes
an impairment reversing processor operable to reverse said visible impairment of said video material to produce client restored material in accordance with said removal data.

37. The system according to claim 36, wherein the apparatus is arranged to associate an identifier with the visibly impaired video material to identify the video material.

38. The system according to claim 36, wherein the said network includes a server for storing the said visibly impaired video material to be broadcast.

39. The system according to claim 36, further comprising:
a store coupled to the said at least one client processors for storing the said video material.

40. The system according to claim 39, wherein the said store is arranged to store impaired video material.

41. The system according to claim 39, wherein the said store is arranged to receive restored video material from the impairment reversing processor and to store restored video material.

42. The system according to claim 36, wherein the said network includes a conditional access and subscriber management system which transfers the removal data.

43. The distribution system of claim 36, wherein the apparatus further comprises:
an input for receiving broadcast impaired video material;
a store for storing the received impaired video material; and
an impairment reversing processor coupled to the said store to receive therefrom the impaired video material for restoring the video material.

44. The distribution system according to claim 43, wherein the apparatus further comprises:
a communications interface for linking the apparatus to a communications network.

45. The distribution system for use in the distribution system of claim 36, wherein the apparatus further comprises:
an input for receiving broadcast impaired video material;
a store for storing the received impaired video material; and
a communications interface for linking the apparatus to a communications network for transferring stored impaired video material to a user remote from the apparatus.

46. The distribution system according to claim 45, wherein the apparatus further comprises:
an impairment reversing processor coupled to the said store via a communications network and the said interface to receive therefrom the impaired video material for restoring the video material.

47. The distribution system according to claim 43, wherein the apparatus further comprises:
a broadcast receiver coupled to the said input for receiving the broadcast impaired video material.

48. The distribution system according to claim 43, wherein the apparatus further comprises:
a data introduction processor operable to introduce data into the said video material.

49. A computer readable storage medium including computer program instructions which cause a computer to implement a method of distributing video material, the method comprising:
introducing data into video material to be distributed with the effect that the introduced data is not perceivable upon presentation of the video material,
introducing a reversible visible impairment into the video material to be distributed, the video material to be distributed including the introduced data together with the reversible impairment therein prior to distribution, the material impairment processor providing the reversible video visible impairment of the video material using an impairment algorithm dependent on an encryption key;
producing removable data corresponding to the algorithm;
negotiating the exchange of video material to be distributed via the network, the video material to be distributed being accessible to a server and including both the reversible visible impairment and the introduced data together therein, when distributed;
negotiating the exchange to receive the video material to be distributed and to receive the removable data separately from the video material via at least one client processor;
distributing said impaired video material and removal data, separately to at least one client processor, and reversing said impairment of said video material to produce restored video material in accordance with said removal data.

50. The system of claim 1, wherein the video to be distributed accessible to the server is resident on a separate device operably linked to the network and made available to the server for access by the separate device.

51. A video material distribution server for providing video material to be distributed via an operably linked network, comprising:
- a data introduction processor operable to introduce data into video material to be distributed, said introduced data is not perceivable upon presentation of the video material,
- a distribution client processor configured to negotiate the exchange of video material to be distributed via the network, the video material to be distributed being accessible to the server;
- a material impairment processor operable to introduce a reversible visible impairment into said material prior to distribution, the material including the introduced data together with the reversible visible impairment when distributed, the material impairment processor providing the reversible visible impairment of said video material using an impairment algorithm dependent on an encryption key, the impairment processor producing removal data corresponding to the algorithm; and
- wherein, the distribution client processor is configured to negotiate the exchange with a client processor, and to provide the video material to be distributed and the removal data separately from the said video material to the client processor, the removal data being provided in accordance with a second negotiation, the removal data being operable to reverse the visible impairment of said video material to produce client restored material.

52. A video material distribution server for providing video material to be distributed via an operably linked network, comprising:
- a data introduction processor operable to introduce data into video material to be distributed, said introduced data is not perceivable upon presentation of the video material,
- a transaction processor configured to negotiate the exchange of video material to be distributed via the network from a providing client external to the server, the video material to be distributed being accessible to the server from the providing client;
- a material impairment processor operable to introduce a reversible visible impairment into said material prior to distribution, the material including the introduced data together with the reversible visible impairment when distributed, the material impairment processor providing the reversible visible impairment of said video material using an impairment algorithm dependent on an encryption key, the impairment processor producing removal data corresponding to the algorithm; and
- wherein, the transaction processor is configured to negotiate the exchange with a client processor, and to provide the video material to be distributed and the removal data separately from the said video material to the client processor, the removal data being provided in accordance with a purchase negotiation, the removal data being operable to reverse the visible impairment of said video material to produce client restored material.

* * * * *